US008119077B2

(12) United States Patent
Taber

(10) Patent No.: US 8,119,077 B2
(45) Date of Patent: Feb. 21, 2012

(54) CONTROL JOINTS IN REFRACTORY LINING SYSTEMS AND METHODS

(75) Inventor: Wade Albert Taber, Katy, TX (US)

(73) Assignee: General Electric Company, Schenectady, NY (US)

( * ) Notice: Subject to any disclaimer, the term of this patent is extended or adjusted under 35 U.S.C. 154(b) by 531 days.

(21) Appl. No.: 12/349,776

(22) Filed: Jan. 7, 2009

(65) Prior Publication Data

US 2010/0170156 A1 Jul. 8, 2010

(51) Int. Cl.
*B01J 19/00* (2006.01)
*C21C 5/44* (2006.01)

(52) U.S. Cl. ........ 422/241; 266/280; 266/283; 266/285; 266/286

(58) Field of Classification Search .................. 422/241; 266/280, 233, 285, 286, 283
See application file for complete search history.

(56) References Cited

U.S. PATENT DOCUMENTS

| | | | | | |
|---|---|---|---|---|---|
| 2,296,392 | A * | 9/1942 | Marchant | 52/443 |
| 2,632,367 | A | 4/1950 | Martin | |
| 2,982,623 | A * | 5/1961 | Johnson | 422/145 |
| 3,366,375 | A * | 1/1968 | Jones | 432/251 |
| 3,806,313 | A * | 4/1974 | Van Laar et al. | 432/214 |
| 3,988,123 | A | 10/1976 | Coates | |
| 4,023,782 | A * | 5/1977 | Eifer | 266/186 |
| 4,340,397 | A | 7/1982 | Schulz | |
| 4,341,514 | A | 7/1982 | Shanks | |
| 4,565,551 | A | 1/1986 | Okane et al. | |
| 4,664,863 | A * | 5/1987 | Venable, Jr. | 264/262 |
| 4,872,886 | A | 10/1989 | Henley et al. | |
| 5,483,548 | A * | 1/1996 | Coble | 373/75 |
| 2003/0167984 | A1 | 9/2003 | Abdullah et al. | |
| 2004/0011245 | A1 * | 1/2004 | Sambasivan et al. | 106/14.12 |
| 2004/0157724 | A1 * | 8/2004 | Doza et al. | 501/95.1 |
| 2007/0128569 | A1 * | 6/2007 | Tenzek et al. | 432/121 |
| 2007/0267789 | A1 * | 11/2007 | Mittag et al. | 266/285 |

FOREIGN PATENT DOCUMENTS

| | | |
|---|---|---|
| DE | 659979 | 6/1938 |
| DE | 31445699 | 6/1983 |

OTHER PUBLICATIONS

EP Search Report for EP Application No. 09180257.9; Mailing date Apr. 19, 2010.

* cited by examiner

*Primary Examiner* — Walter D Griffin
*Assistant Examiner* — Huy-Tram Nguyen
(74) *Attorney, Agent, or Firm* — Cantor Colburn LLP

(57) ABSTRACT

A refractory lining system comprises an inner refractory layer; and an outer layer located outside of the inner refractory layer, the outer layer comprising: a plurality of layer segments; and at least one control joint located between the plurality of layer segments, the at least one control joint configured to allow expansion and contraction in the outer layer. A segment of an outer layer of a refractory lining comprises an edge shaped corresponding to a control joint configured to allow expansion and contraction in the outer layer.

16 Claims, 4 Drawing Sheets

CONTROL JOINTS IN REFRACTORY LINING SYSTEMS AND METHODS

BACKGROUND OF THE INVENTION

The subject matter disclosed herein relates to refractory vessel design.

A gasifier is a type of reactor used for partial oxidation of a fossil fuel, such as coal or a heavy fuel oil, to produce energy. Temperatures inside a gasifier vessel may reach over 700° C. during operation. A gasifier vessel may be insulated by a multi-layer refractory lining. The vessel and lining may comprise concentric cylindrical layers. During gasifier operation, high temperatures may cause the layers to expand outwardly, or radially. Each layer may expand differently, according to the temperature and the coefficient of thermal expansion (COE) of the particular layer. The inner layers are at a higher temperature, and may have a higher COE, than the outer layers. Inner layers may push against the outer layers due to expansion that occurs during operation of the gasifier, as the outer layers may expand less than the inner layer. This may cause the outer layers to develop cracks or open joints, resulting in gas bypass through the refractory lining. Gas bypass may cause high skin temperatures, or hot spots, in the outer shell of the gasifier. Forced shutdown of the gasifier may be necessary if hot spots become severe, leading to costly maintenance and loss of productivity.

Accordingly, there remains a need in the art for a refractory lining that is resistant to cracking.

BRIEF DESCRIPTION OF THE INVENTION

According to one aspect of the invention, a refractory lining system comprises an inner refractory layer; and an outer layer located outside of the inner refractory layer, the outer layer comprising: a plurality of layer segments; and at least one control joint located between the plurality of layer segments, the at least one control joint configured to allow expansion and contraction in the outer layer.

According to another aspect of the invention, a segment of an outer layer of a refractory lining comprises an edge shaped corresponding to a control joint configured to allow expansion and contraction in the outer layer.

According to yet another aspect of the invention, a method of making an outer layer of a refractory lining comprises forming a plurality of segments of the outer layer, each segment comprising an edge shaped corresponding to a control joint configured to allow expansion and contraction in the outer layer; and assembling the plurality of segments to form the outer layer of the refractory lining.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other, features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

A gasifier vessel comprises a plurality of refractory lining layers to insulate the high temperature at which the gasification process occurs. If a lining layer cracks, gas from the gasification process may pass through the lining to the outer shell of the gasifier, resulting in hot spots on the outer shell and possible damage to the gasifier. A primary cause of hot spots in the outer shell of a gasifier may be prevented by providing a plurality of control joints in an outer layer of the refractory lining. Control joints, also referred to a non-continuous joints, slip joints or shiplaps, are a mechanical construction that allow expansion and contraction in a structure. The control joints mitigate radial expansion differences between the various layers of the gasifier lining. A slip plane within the control joint prevents formation of a continuous gas path during opening of the joint. The control joint may slide open by a small margin without significant gas bypass, reducing the stress and failure modes of the castable layer. A reduction in stress in an outer layer is accompanied by a proportional decrease in the amount of opposing stress in the inner layer, reducing the rate of failure and long term deformation or creep in the gasifier lining. Reliability of the gasifier is increased, resulting in reduced operating costs due to decreased unplanned outages. Incorporation of control joints into an outer layer does not entail significant increase in installation schedules or material costs, as materials and installation techniques already in use may be used to implement non-continuous joints in the outer layer.

Figure 1:
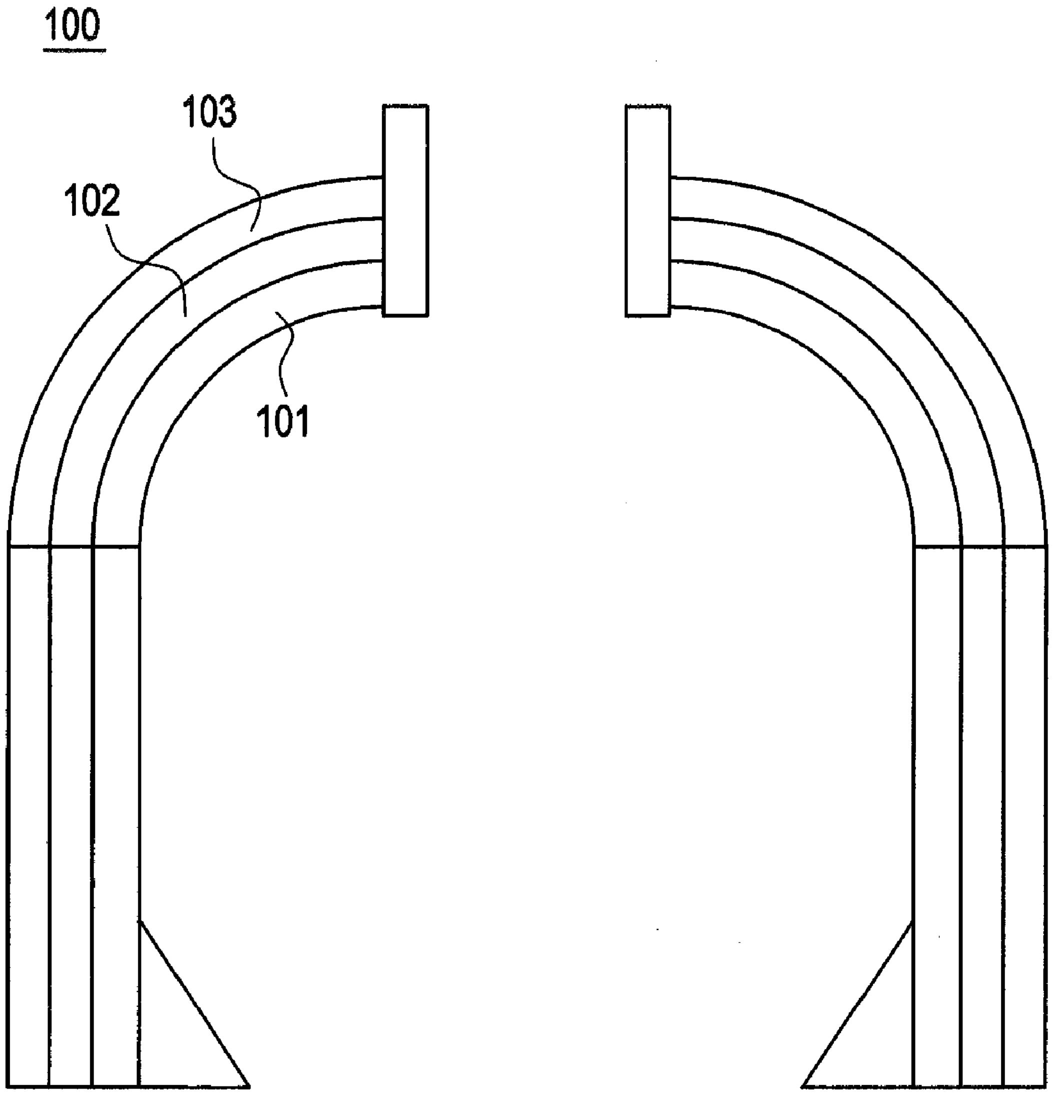
FIG. 1 is a side cross-section of an embodiment of a refractory lining.

Referring to FIG. 1, a gasifier 100 may include a plurality of refractory lining layers, including but not limited to an inner refractory layer 101, an outer thermal layer 102, and an outer shell 103. While three layers are shown in the embodiment of a gasifier shown in FIG. 1, a gasifier may include any appropriate number of lining layers. Outer thermal layer 102 may comprise a monolithic refractory, for example, concrete, in some embodiments. The inner refractory layer 101 expands radially during operation of the gasifier, and pushes against outer thermal layer 102. This may cause outer thermal layer 102 to crack due various factors, including initial shrinkage, relatively low tensile strength, and lesser radial expansion. The cracking may be substantial, extending from the back of the refractory layer 101 directly to the outer shell 103. Such cracking may result in gas bypass through outer thermal layer 102, causing hot spots in outer shell 103.

Figure 2:
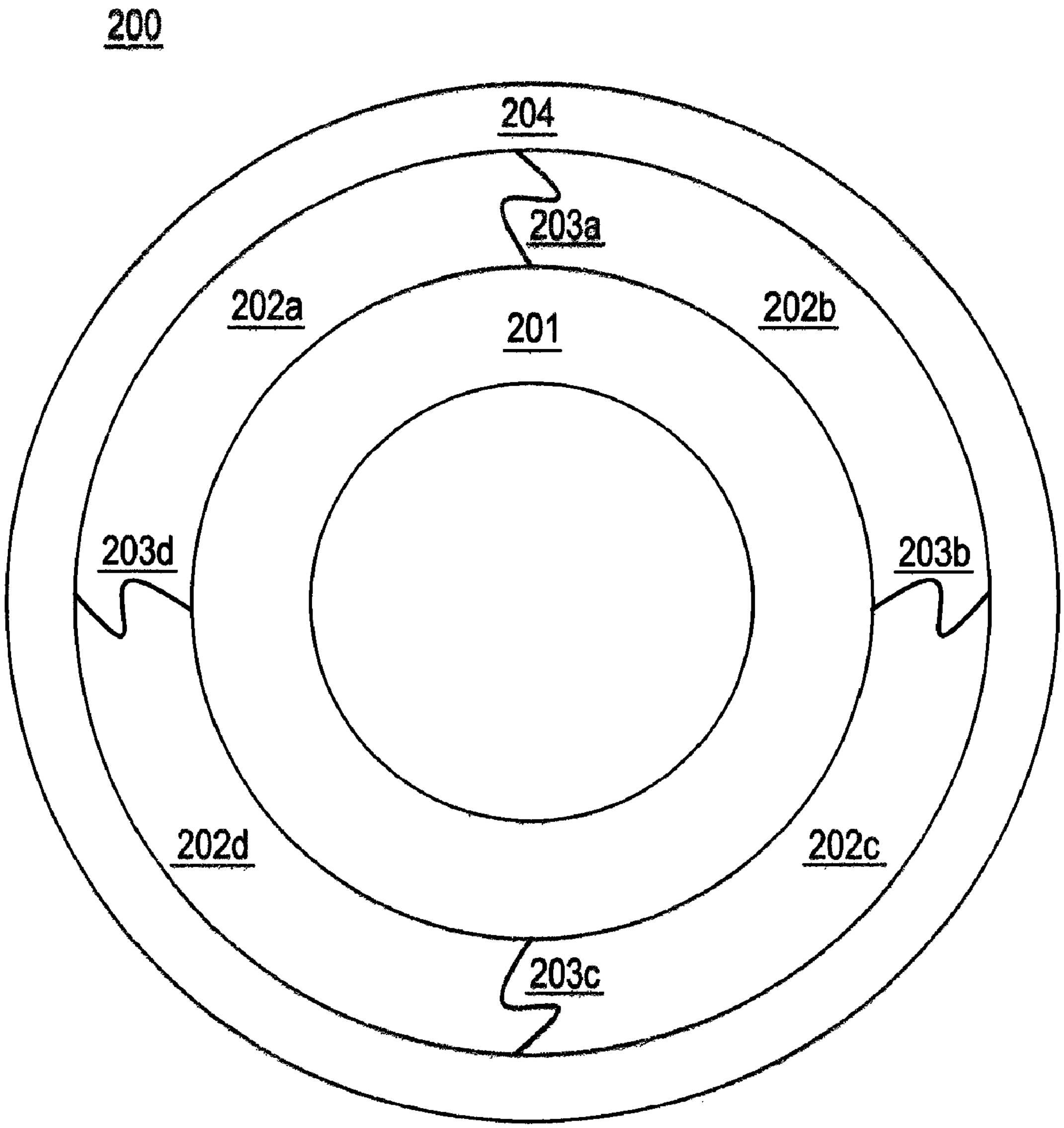
FIG. 2 is a top cross-section of an embodiment of a refractory lining comprising non-continuous joints.

FIG. 2 shows a top cross section of an embodiment of a refractory lining 200 comprising control joints. The refractory lining 200 comprises outer shell 204, inner refractory layer 201, and an outer thermal layer that comprises segments 202*a*, 202*b*, 202*c*, and 202*d* joined by control joints 203*a*, 203*b*, 203*c*, and 203*d*. The outer thermal layer may be divided into a plurality of segments; the four segments 202*a-d* shown in the embodiment of FIG. 2 are for illustrative purposes only.

Control joints 203*a-d* prevent cracking in the outer thermal layer by opening under pressure, creating space between segments 202*a-d*. The control joints 203*a-d* are shaped in a manner that opening of control joints 203*a-d* does not provide a continuous path for gas bypass from the refractory layer 201 to the outer shell 203. Control joints 203*a-d* thereby relieve the stress in segments 202*a*-*d* that is caused by growth of inner refractory layer 201 during operation of the gasifier, preventing cracking of the refractory lining, while preventing hot spot formation.

Figure 3:
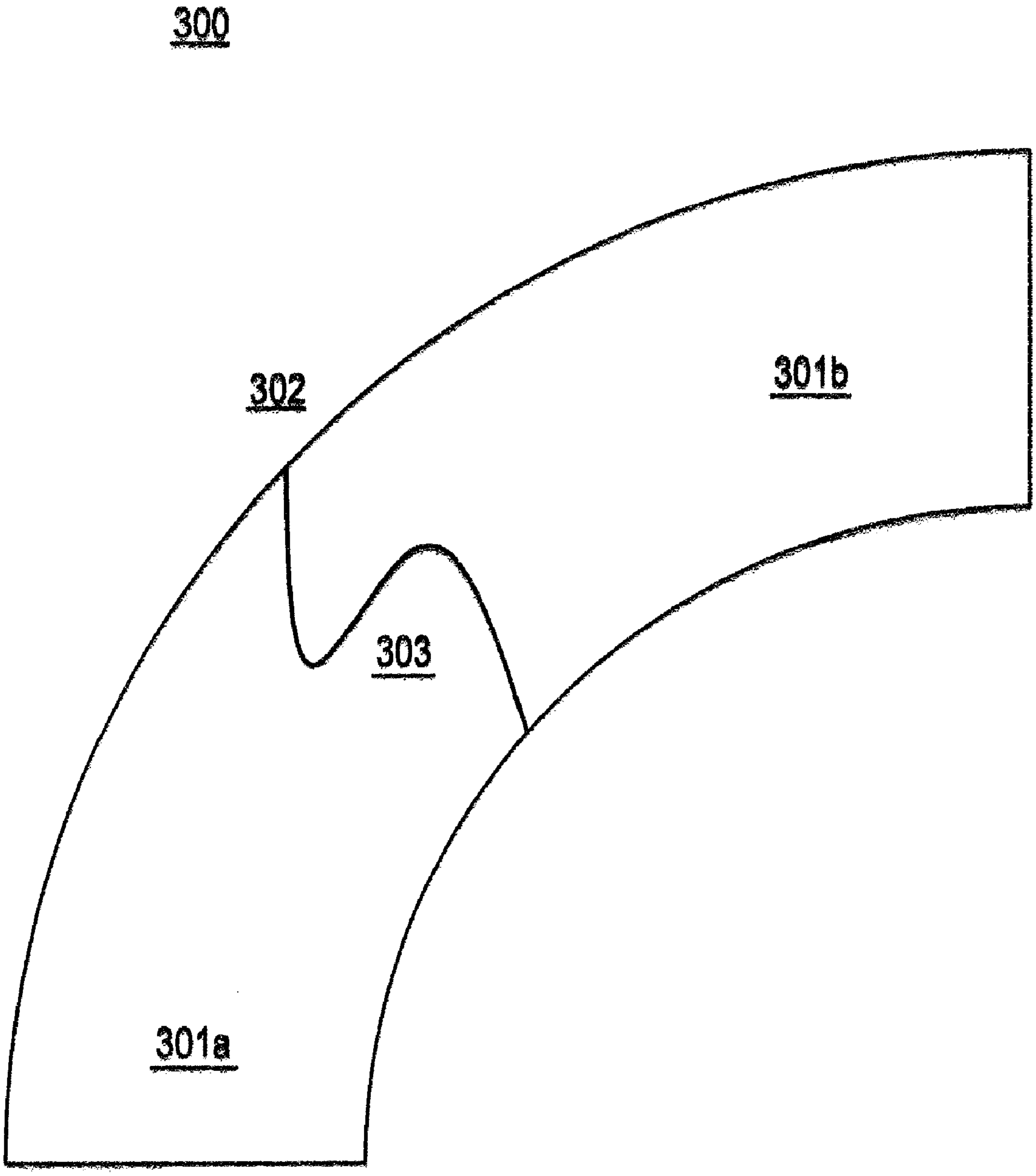
FIG. 3 shows a portion of an embodiment of outer thermal layer comprising a control joint.

FIG. 3 shows portion of an embodiment of an outer thermal layer 300 comprising a control joint. The outer thermal layer comprises segments 301*a* and 301*b*; between the segments is a control joint 302. Each of segments 301*a* and 301*b* comprise an edge that interlocks with the edge of the adjacent segment. Control joint 302 comprises a center slip plane 303, which prevents the open joint from extending straight from the inner refractory layer 201 to the outer shell 204. The slip plane 303 is angled to disallow gas bypass between segments 301*a* and 301*b* during opening of non-continuous joint 302. The slip plane 303 may comprise a shiplap joint in some embodiments. The specific angle, curvature and dimensions of non-continuous joint 302 depend on the dimensions of the gasifier and the various layers that make up the refractory lining. Segments 301*a* and 301*b* may move apart without allowing gas to penetrate through the thermal layer.

Figure 4:
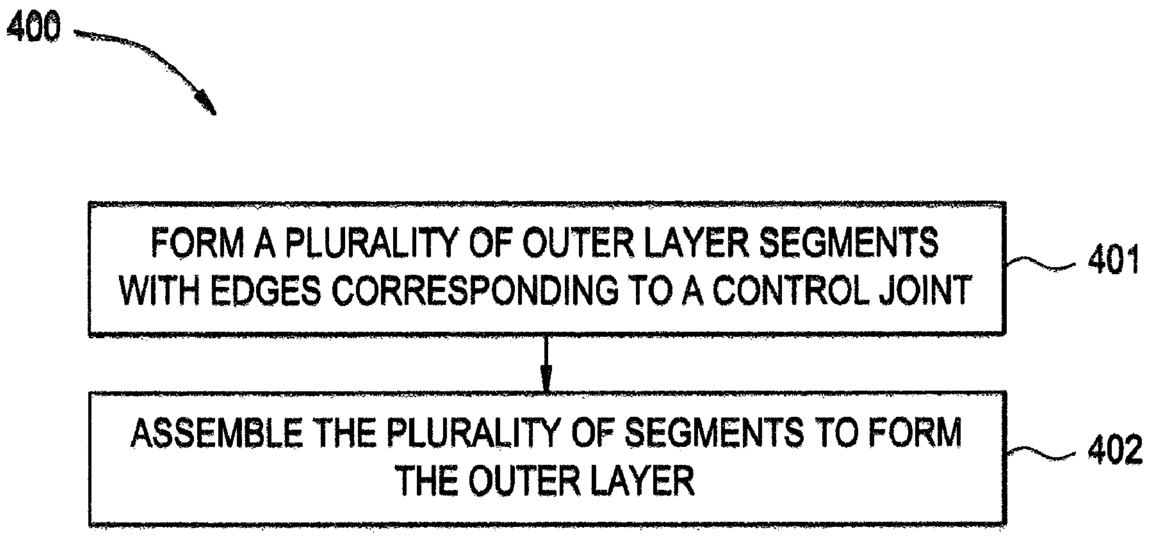
FIG. 4 shows an embodiment of a method of making an outer thermal layer comprising control joints.

The outer thermal layer comprising control joints may be formed from a monolithic material, a cast in place refractory material, a deformable ceramic, or constructed with pre-cast shapes. An embodiment of a method 400 for casting an outer thermal layer comprising control joints is shown in FIG. 4. In block 401, a plurality of segments of the outer layer are formed. Each segment comprises an edge shaped corresponding to a control joint configured to allow expansion and contraction in the outer layer. In block 402, the segments are assembled to form the outer layer of the refractory lining.

Although control joints in a refractory layer have been discussed above in the context of a gasifier for illustrative purposes, control joints may be incorporated into any cylindrical vessel comprising a refractory lining, which may include, but are not limited to, shaft furnaces, petrochemical reactors, or cylindrical cement kilns.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A refractory lining system for a gasifier vessel, comprising:
- an inner refractory layer of the gasifier vessel; and
- an outer layer of the gasifier vessel located outside of the inner refractory layer, the outer layer comprising:
  - a plurality of layer segments; and
  - at least one control joint located between two of the plurality of layer segments of the outer layer, the at least one control joint configured to allow expansion and contraction in the outer layer, wherein the at least one control joint of the outer layer comprises a shiplap joint.

2. The system of claim 1, wherein the outer layer comprises a monolithic material.

3. The system of claim 2, wherein the monolithic material comprises precast concrete.

4. The system of claim 2, wherein the monolithic material comprises one of cast in place concrete or deformable ceramic.

5. The system of claim 1, wherein the at least one control joint is further configured to open to relieve stress in the plurality of layer segments caused by pressure from thermal expansion of the inner refractory layer.

6. The system of claim 5, wherein the at least one control joint is further configured to disallow gas bypass between the plurality of layer segments during opening of the at least one control joint.

7. The system of claim 1, further comprising an outer shell located outside of the outer layer.

8. A segment of an outer layer of a refractory lining for a gasifier vessel comprising an edge shaped corresponding to a control joint configured to allow expansion and contraction in the outer layer, wherein the edge shaped corresponding to a control joint of the outer layer comprises a ship lap joint.

9. The segment of an outer layer of a refractory lining of claim 8, wherein the edge shaped corresponding to a control joint is further configured to open to relieve stress in the segment caused by pressure from thermal expansion of an inner refractory layer of the gasifier vessel.

10. The segment of an outer layer of a refractory lining of claim 9, wherein the edge shaped corresponding to a control joint is further configured to disallow gas bypass between the segment and an adjacent segment of the outer layer of a refractory lining.

11. The segment of an outer layer of a refractory lining of claim 8, wherein the segment comprises a monolithic material.

12. The segment of an outer layer of a refractory lining of claim 11, wherein the monolithic material comprises precast concrete.

13. The segment of an outer layer of a refractory lining of claim 11, wherein the monolithic material comprises one of cast in place concrete or deformable ceramic.

14. A method of making an outer layer of a refractory lining of a gasifier vessel, comprising:
- forming a plurality of segments of the outer layer of the gasifier vessel, each segment comprising an edge shaped corresponding to a control joint configured to allow expansion and contraction in the outer layer, wherein the edge shaped corresponding to a control joint of the outer layer comprises a ship lap joint; and
- assembling the plurality of segments to form the outer layer of the refractory lining of the gasifier vessel.

15. The method of making an outer layer of a refractory lining of claim 14, wherein each edge shaped corresponding to a control joint is further configured to open to relieve stress in the outer layer caused by pressure from thermal expansion of an inner refractory layer of the gasifier vessel.

16. The segment of an outer layer of a refractory lining of claim 15, wherein each edge shaped corresponding to a control joint is further configured to disallow gas bypass between adjacent segments of the assembled outer layer of a refractory lining.

* * * * *